US009658899B2

(12) United States Patent
Jenkins

(10) Patent No.: US 9,658,899 B2
(45) Date of Patent: May 23, 2017

(54) DISTRIBUTED LOCK MANAGEMENT IN A CLOUD COMPUTING ENVIRONMENT

(71) Applicant: Amazon Technologies, Inc., Reno, NV (US)

(72) Inventor: George Oliver Jenkins, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 897 days.

(21) Appl. No.: 13/914,104

(22) Filed: Jun. 10, 2013

(65) Prior Publication Data

US 2014/0365549 A1    Dec. 11, 2014

(51) Int. Cl.
*G06F 15/16* (2006.01)
*G06F 9/52* (2006.01)
*G06F 9/50* (2006.01)

(52) U.S. Cl.
CPC ............ *G06F 9/526* (2013.01); *G06F 9/5077* (2013.01)

(58) Field of Classification Search
CPC . G06F 9/52; G06F 9/526; G06F 9/544; G06F 17/30306; G06F 17/3048; G06F 9/45504
See application file for complete search history.

(56) References Cited

U.S. PATENT DOCUMENTS

| 8,458,517 | B1 * | 6/2013 | Vermeulen | G06F 11/1458 709/201 |
| 2006/0248131 | A1 * | 11/2006 | Marwinski | G06F 9/52 |
| 2006/0271395 | A1 * | 11/2006 | Harris | G06F 9/52 718/1 |
| 2008/0091680 | A1 * | 4/2008 | Eshel | H04L 12/417 |
| 2008/0109807 | A1 * | 5/2008 | Rosenbluth | G06F 9/526 718/102 |

(Continued)

OTHER PUBLICATIONS

International Search Report and Written Opinion from PCT/US14/41724, issued Oct. 22, 2014, Amazon Technologies, Inc., pp. 1-11.

(Continued)

*Primary Examiner* — Philip Chea
*Assistant Examiner* — Mohammed Ahmed
(74) *Attorney, Agent, or Firm* — Robert C. Kowert; Meyertons, Hood, Kivlin, Kowert & Goetzel, P.C.

(57) ABSTRACT

A distributed lock manager (DLM) may be implemented in a distributed computing system that provides virtualized computing resources and/or virtual computing services to clients. Locks may be created and managed by the DLM in response to requests from clients to do so. The components of the DLM may communicate with each other over a network other than one over which client application components communicate with each other or access the shared resources protected by the locks. For example, DLM components may communicate over a control plane network of a cloud computing environment and application components may communicate over a data plane network of the cloud computing environment. The DLM may expose an API to clients, allowing them to make local calls to a DLM component on the same node to perform various lock management operations. The meanings of the lock values may be established by their use in client applications.

21 Claims, 9 Drawing Sheets

(56) References Cited

U.S. PATENT DOCUMENTS

| | | |
|---|---|---|
| 2008/0243847 A1 | 10/2008 | Rasmussen |
| 2009/0161547 A1 | 6/2009 | Riddle et al. |
| 2009/0249473 A1* | 10/2009 | Cohn ................ H04L 29/12028 726/15 |
| 2010/0017409 A1 | 1/2010 | Rawat et al. |
| 2011/0106778 A1 | 5/2011 | Chan et al. |
| 2011/0145821 A1 | 6/2011 | Philipson et al. |
| 2011/0296069 A1 | 12/2011 | Tarta et al. |
| 2012/0089569 A1 | 4/2012 | Mason, Jr. et al. |
| 2012/0239814 A1* | 9/2012 | Mueller ................ G06F 9/5061 709/226 |
| 2012/0259820 A1 | 10/2012 | Patwardhan |
| 2012/0310881 A1* | 12/2012 | Shadmon .......... G06F 17/30578 707/613 |
| 2013/0060742 A1 | 3/2013 | Chang et al. |
| 2014/0365549 A1* | 12/2014 | Jenkins .................. G06F 9/526 709/201 |

OTHER PUBLICATIONS

Extended European Search Report from PCT/US2014/041724, Date Dec. 16, 2016, Amazon Technologies, Inc., pp. 1-9.

* cited by examiner

DISTRIBUTED LOCK MANAGEMENT IN A CLOUD COMPUTING ENVIRONMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In some systems that support distributed computing, application components or processes of a distributed application may (from time to time) access shared resources of various types. In some such systems, distributed lock managers are used to control and/or synchronize accesses to those shared resources.

Figure 1:
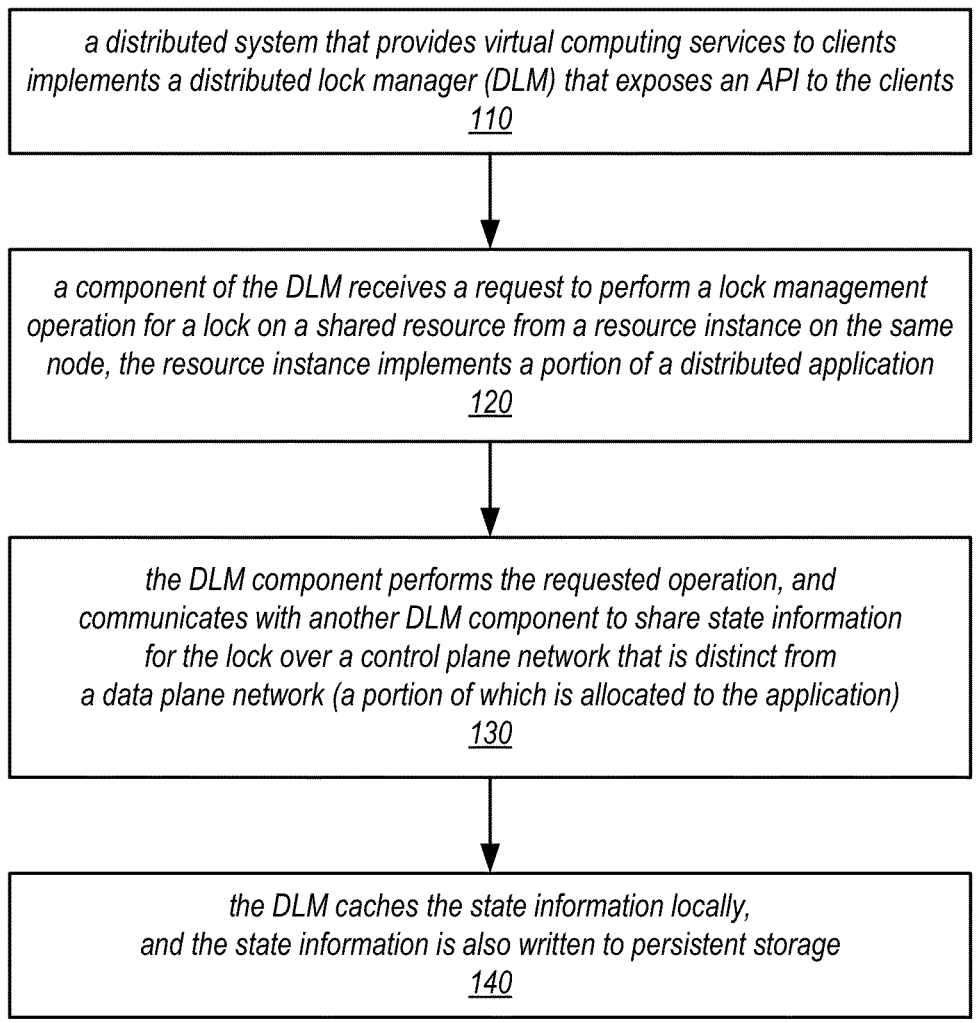
FIG. 1 is a flow diagram illustrating one embodiment of a method for providing a distributed lock manager in a distributed computing system that provides virtual computing systems.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of systems and methods for implementing distributed lock management in a system that provides virtualized computing resources to clients are described herein. In some embodiments, components of a distributed lock manager (DLM) may communicate with each other to manage locks on shared resources over a network (or a portion of a network) that is physically or logically distinct from another network (or portion of a network) over which application components of a distributed application that access the shared resources communicate with each other and/or with the shared resources. For example, in some embodiments, DLM components may communicate with each other over a control plane network of a cloud computing environment, while application components of a distributed application may communicate with each other and/or with shared resources over a data plane network of the cloud computing environment. In some embodiments, an application programming interface (API)

may be exposed to client applications (or components thereof) executing outside of the cloud computing environment in addition to being exposed to client applications (or components thereof) executing within the cloud computing environment. In such embodiments, any of the client applications (or components thereof) may participate in the locking mechanisms of the DLM (e.g., to initiate lock management operations on locks for resources shared by those client applications).

Note that in a clustered environment, such as one that implements distributed applications and/or provides virtualized computing resources to client applications, there may be different levels of sharing that can go on between resources. These systems may implement a variety of mechanisms to manage resources that need to move around (e.g., in response to the failure of a computing node or in other failover situations). For example, in a system in which ten virtualized instances are executing within a virtual private cloud (VPC), there may come a time at which it is desirable to move a network interface (e.g., an elastic network interface, or ENI, or another type of virtual network interface) among the different instances (e.g., to disconnect it from one instance and reconnect to another instance).

Some existing systems use distributed lock managers to control and synchronize accesses to shared resources, but these systems typically require network connectivity. For example, some clustering technologies use the network as an interconnect mechanism for a DLM that is used to manage the locks that the clusters use. In various embodiments, the systems described herein may implement a distributed lock manager (DLM) that does not require such network connectivity. Instead, the DLM may be implemented in the control plane of a cloud computing environment, and may be accessed by distributed applications executing on resource instances in the cloud computing environment (e.g., in order to manage one or more locks on resources that are accessible by those distributed applications) using a variety of API calls. In some embodiments, the resource instances on which application components of a distributed application execute may be configured as a virtual private cloud (VPC), e.g., when a customer wants their application to be isolated from other applications (i.e., not visible to other applications or customers and/or running on different virtual machines than other applications). In some embodiments, each virtual machine executing in a virtual private cloud may be given its own private IP address. In some embodiments, these private IP addresses (which may also be referred to as "virtual private IP addresses") may be selected such that they do not overlap with any of the IP addresses in the client's own private network. In some embodiments, the resource instances within the VPC may send service requests to the DLM using a public service API, while in other embodiments, the resource instances within the VPC may send service requests to the DLM using a private service API.

Since clustered systems typically include at least some shared resources, DLMs may be very useful in these environments. As noted above, distributed lock managers may be used by distributed applications to control and/or synchronize accesses to shared resources of various types. In various embodiments, a lock may be associated with any type of resource (e.g., a disk volume, an ENI or another type of virtual network interface, a database row, or a file), or in general any entity to which accesses by multiple processes should be controlled (including, e.g., an application component or resource instance).

In some embodiments, a DLM may implement a locking hierarchy having an arbitrary number of levels, such that individual resources/entities may be locked, or collections of resources/entities (e.g., a "parent" resource that includes two or more "child" resources) may be locked. In some embodiments, a lock must be obtained on a higher level resource (e.g., a parent resource) before a lock can be obtained on a lower level resource (e.g., a child resource).

In various embodiments, the distributed lock managers described herein may support a variety of lock modes, each of which may indicate the sharing properties of the associated resource/entity (or its lock). For example, any or all of the following lock modes may be supported, in different embodiments:

- a null lock mode, which allows a process that holds a lock in this mode to express an interest in the associated shared resource, but does not prevent any accesses to the associated shared resource by the process or by other processes
- a concurrent read lock mode, which allows the process to read (but not modify) the associated shared resource and allows other processes to read or modify the associated shared resource, but which prevents exclusive access to the associated shared resource
- a concurrent write lock mode, which allows the process to read or modify the associated shared resource and allows other processes to read or modify the associated shared resource, but which prevents exclusive access to the associated shared resource
- a protected read lock mode, which allows the process to read (but not modify) the associated shared resource and allows other processes to read (but not modify) the associated shared resource
- a protected write lock mode, which allows the process to read or modify the associated shared resource and allows other processes that have concurrent read access to read (but not modify) the associated shared resource
- exclusive lock mode, which allows the process to read or modify the associated shared resource, but which prevents any access to the associated shared resource by other processes In some embodiments, obtaining (acquiring) a lock on a shared resource may include communicating a request to obtain the lock (e.g., to a component of the DLM) and/or enqueueing on the lock (e.g., adding an indicator of the requesting process to a queue of processes waiting to obtain/acquire the lock). The lock request may be synchronous (e.g., the process may wait for the lock to be granted) or asynchronous (e.g., the process may continue with other operations that do not require the lock, but may be interrupted when and if the lock is granted), in different embodiments.

In some embodiments, a lock data structure (or other representation of a lock that is created and/or managed by a DLM) may include a lock value, the meaning of which may be established by its use in an application. In some such embodiments, the DLM may not know (or need to know) what the meaning of the lock value is. In some embodiments, the lock value may identify a process or an application that owns a shared resource associated with the lock. In some embodiments, the lock value may be a monotonically increasing value that represents a version identifier for the lock or for the associated shared resource. In some embodiments, prior to accessing a shared resource, a process (or application) may read the value of the associated lock. If the value has not changed since the last time the process (or application) obtained the lock, the process (or application) may know that the shared resource has not been modified by another process (or application) since the last time that the process (or application) accessed the shared resource. In some embodiments, the DLMs described herein may support or provide deadlock detection.

As previously noted, in some embodiments a DLM may be implemented in a distributed computing environment (e.g., a cloud computing environment that provides virtualized computing resources and/or virtual computing services to clients) in a manner such that the DLM components communicate with each other over a control plane network (e.g., using network connectivity or throughput capacity other than that allocated to client applications executing in the cloud). In such embodiments, communication between the DLM components may not consume the network resources that are intended for the use of the client applications or otherwise interfere with the communication between components of the client applications.

Figure 9:
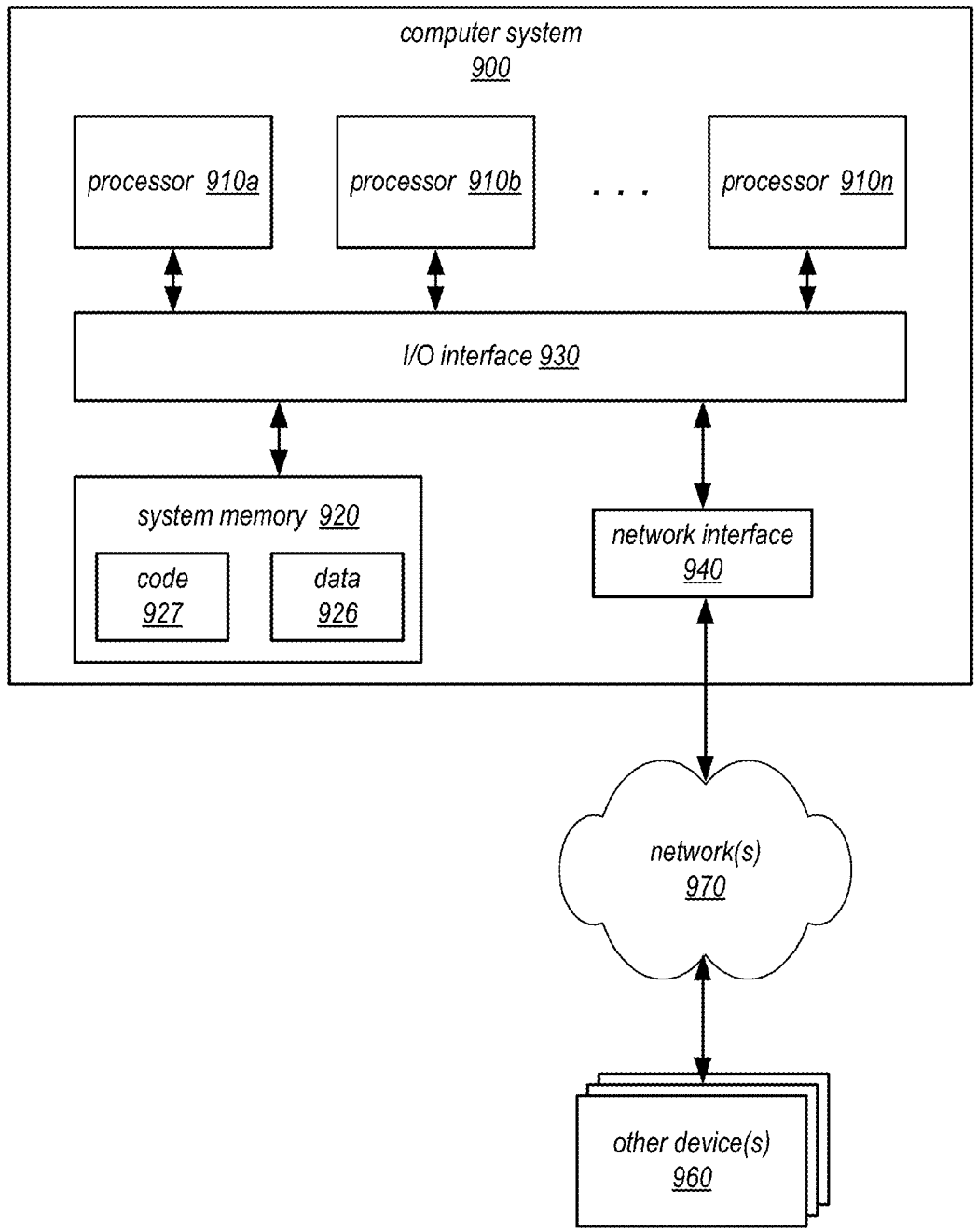
FIG. 9 is a block diagram illustrating an example computer system that implements some or all of the techniques described herein, according to different embodiments.

The systems and methods described herein may be implemented on or by one or more computing systems within a network environment, in different embodiments. An example computer system on which embodiments of the distributed lock managers described herein may be implemented is illustrated in FIG. 9. Embodiments of various systems and methods for implementing these distributed lock managers are generally described herein in the context of a service provider that provides to clients, via an intermediate network such as the Internet, virtualized resources (e.g., virtualized computing and storage resources) implemented on a provider network of the service provider. FIGS. 2-4, 7 and 9 (and the corresponding descriptions thereof) illustrate and describe example environments in which embodiments of the systems and methods described herein may be implemented, and are not intended to be limiting. In at least some embodiments, at least some of the resources provided to clients of the service provider via the provider network may be virtualized computing resources implemented on multi-tenant hardware that is shared with other client(s) and/or on hardware dedicated to the particular client. Each virtualized computing resource may be referred to as a resource instance. Resource instances may, for example, be rented or leased to clients of the service provider. For example, clients of the service provider may access one or more services of the provider network via APIs to the services to obtain and configure resource instances and to establish and manage virtual network configurations that include the resource instances, for example virtualized private networks.

Figure 3:
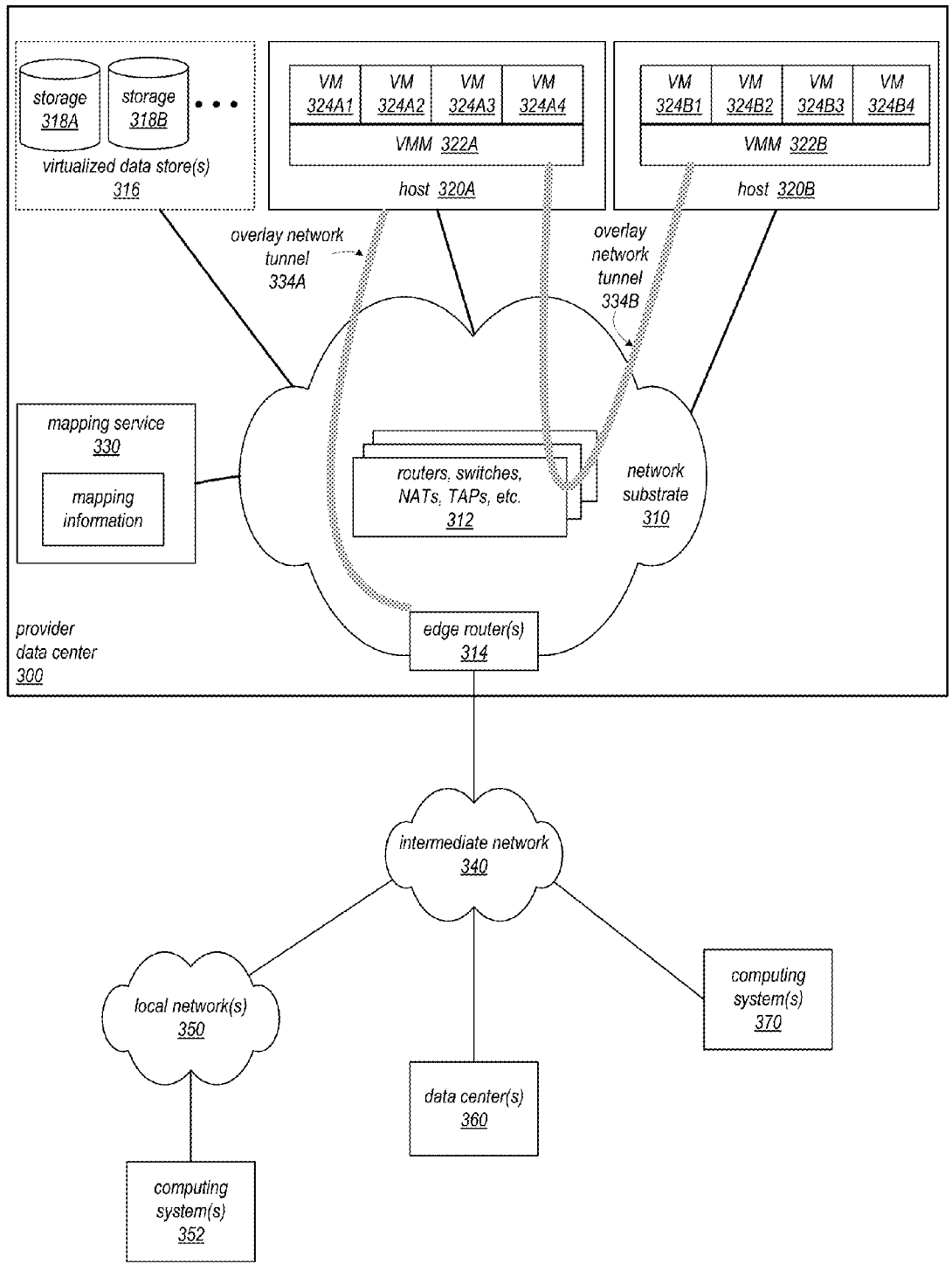
FIG. 3 is a block diagram illustrating an example data center, according to some embodiments.

In some embodiments, the resource instances may, for example, be implemented according to hardware virtualization technology that enables multiple operating systems to run concurrently on a host computer, i.e. as virtual machines (VMs) on the hosts. A hypervisor, or virtual machine monitor (VMM), on a host may present the VMs on the host with a virtual platform and monitors the execution of the VMs. Each VM may be provided with one or more private IP addresses; the VMM on a host may be aware of the private IP addresses of the VMs on the host. An example of a system that employs such a hardware virtualization technology is illustrated in FIG. 3 and described in detail below.

In some embodiments, the VMMs may use Internet Protocol (IP) tunneling technology to encapsulate and route client data packets over a network substrate between client resource instances on different hosts within the provider network. The provider network may include a physical network substrate that includes networking devices such as routers, switches, network address translators (NATs), and so on, as well as the physical connections among the devices. The provider network may employ IP tunneling technology to provide an overlay network via which encapsulated packets (that is, client packets that have been tagged with overlay network metadata including but not limited to overlay network address information for routing over the overlay network) may be passed through the network substrate via tunnels or overlay network routes. The IP tunneling technology may provide a mapping and encapsulating system for creating the overlay network on the network substrate, and may provide a separate namespace for the overlay network layer (public IP addresses) and the network substrate layer (private IP addresses). In at least some embodiments, encapsulated packets in the overlay network layer may be checked against a mapping directory to determine what their tunnel substrate target (private IP address) should be. The IP tunneling technology may provide a virtual network topology overlaid on the physical network substrate; the interfaces (e.g., service APIs) that are presented to clients are attached to the overlay network so that when a client resource instance provides an IP address to which packets are to be sent, the IP address is run in virtual space by communicating with a mapping service that can determine where the IP overlay addresses are. An example use of overlay network technology is illustrated in FIG. 3 and described in detail below.

Client resource instances on the hosts may communicate with other client resource instances on the same host or on different hosts according to stateful protocols such as Transmission Control Protocol (TCP) and/or according to stateless protocols such as User Datagram Protocol (UDP). However, the client packets are encapsulated according to an overlay network protocol by the sending VMM and unencapsulated by the receiving VMM. A VMM on a host, upon receiving a client packet (e.g., a TCP or UDP packet) from a client resource instance on the host and targeted at an IP address of another client resource instance, encapsulates or tags the client packet according to an overlay network (or IP tunneling) protocol and sends the encapsulated packet onto the overlay network for delivery. The encapsulated packet may then be routed to another VMM via the overlay network according to the IP tunneling technology. The other VMM strips the overlay network encapsulation from the packet and delivers the client packet (e.g., a TCP or UDP packet) to the appropriate VM on the host that implements the target client resource instance. In other words, in some embodiments, although there may be a single underlying physical network in the service provider computing environment (e.g., the service provider data center), the encapsulations described herein may allow it to appear as if each client application (or each client resource instance on which one or more client applications execute) is running on its own virtual network (e.g., data packets for multiple client applications may be traveling on the same physical network but it may appear as if the traffic directed to each of the client applications is traveling on a private network).

In some embodiments, the overlay network may be a stateless network implemented according to a connectionless (or stateless) IP protocol. In some such embodiments, the sending VMM sends the encapsulated packet onto the overlay network for routing and delivery, but does not receive an acknowledgement (ACK) or other response regarding delivery of the packet. In other embodiments, the VMM may receive an ACK or other response regarding delivery of an encapsulated packet.

Unlike in existing systems in which the components of distributed lock managers execute and/or communicate within the same data plane(s) as the applications that employ the locks managed by them, in some embodiments of the systems described herein, a distributed lock manager may be incorporated into the control plane layer of a distributed computing system (e.g., a system that provides virtual computing resources and/or virtual computing services to clients), and this control plane layer may have a different network availability than the client software that is executing on the virtualized resources in the system. In some embodiments, the client software may not be aware of the network availability of the control plane layer or of the DLM, which may be exposed to the client as a service (e.g., through an API).

As noted above, in existing systems that include a DLM, the connection mechanism used by components of the DLM to communicate with each other is the same connection mechanism over which the resources associated with the locks are accessed by client applications. However, in some embodiments of the systems described herein, this is not the case. Instead, a client application may only need to make local API calls in order to participate in the locks and locking mechanism described herein. In some embodiments, the locks managed by the DLM may have unique identifiers (or unique identifiers with a particular namespace), which from the perspective of the API may be considered "handles" for the locks. As noted above, in some embodiments, a client application may not need to know anything about the network connections utilized by DLM components to communicate with each other. Instead, it may operate on the locks by invoking one or more APIs, each corresponding to a particular lock management operation. In some embodiments, it may be the responsibility of the client applications to determine how to use the locks and/or how to advertise the locks. In some embodiments, once a process or application creates a lock, one or more other processes or applications (sometimes referred to as "participants") may subscribe to the lock (e.g., as an observer or according to other lock modes).

Unlike some existing DLMs, the DLMs described herein may include hooks into the control planes of the distributed systems in which they are implemented that allow users to create locks with different sharing levels and to manage those locks without relying on the network connectivity of the applications that use the locks.

In some embodiments, the distributed lock managers described herein may span the boundary between on-premise hosts (e.g., those executing on client networks) and hosts executing in a provider network (e.g., a public or private cloud computing environment). In some embodiments, implementing the techniques described herein may include building a set of software components that allow DLM locks to be obtained, manipulated and managed by hosts that are on a client network (e.g., at a customer's site) and/or hosts that are inside a cloud computing environment. The locks themselves may be relatively simple, and it may be entirely up to the client application designer to decide what resources should be locked, and when they should be locked. In various embodiments, the resources associated with the locks may include disk volumes, virtual network adapters, files, records or other items within a database, or any other resources that an application developer wishes to protect from unsynchronized accesses by multiple processes. As noted above, the locks may be grouped into hierarchies. For example, there may be record locks associated with a file lock, or groups of hosts sharing a set of locks.

In some embodiments, when the state of a lock changes (e.g., when it is acquired for exclusive write access), all of the subscribers to the lock will have a consistent point-in-time view of the lock. In other words, lock state changes may be atomic, in that only one process can modify the lock state at a time (and only when that process holds an exclusive lock), and at any given time, all of the participants in the lock would see the same value. In some embodiments, the locks themselves may be durable in that the locks persist even in the absence of any subscribers. For example, if there are three hosts sharing a lock on a disk volume (e.g., two in a cloud computing environment and one on-premises), one of which is holding the lock for exclusive write, and if all three hosts fail or are shut down and then subsequently rebooted, the state of the lock may be maintained by the lock manager and the exclusive write lock may still held by the host that acquired it. For example, the lock state may be maintained somewhere in the control plane that is participating in the locking mechanism other than on the hosts on which application components that use the lock are executing. In some embodiments, local processes (e.g., client applications executing in various resource instances in the cloud computing environment and/or on a client network) may maintain a cached view of the lock state of each lock created on their behalf by the DLM, and there may also be a copy of the lock state of each lock in a persistent data store in the cloud computing environment (e.g., in a database).

In some embodiments, the locks may also be secure, in the sense that they may have security access properties that require authentication in order to join a lock group or access a lock in order to view and/or modify the lock. As previously noted, a lock may include a value whose meaning is determined by the application or virtual computing service that makes use of the lock. Note that in some embodiments, it may be the responsibility of the client applications to follow their own locking rules. For example, if an application executing in a cloud computing environment associates a lock with a disk volume, the cloud computing environment may not know or need to know that this association exits. Instead, it may be up to the application to know what the association is and how the lock is being associated with the resource. In some embodiments, the associations between locks and corresponding resources may not even be visible to other entities in the cloud computing environment (e.g., the administrative components of the cloud computing environment). As previously noted, it may also be up to the client applications (or the designer of the applications) to decide how to use the locks and what their values mean (e.g., it may be up to the client applications to define the relationships between locks and the shared resources that they protect and/or control access to). For example, in a clustered application in which a file is passed around, a lock associated with the file may indicate which application component or process owns the file at any given point in time.

In some embodiments, the value may be a monotonically increasing version number, as described above. In some embodiments, the techniques described herein may be implemented by software libraries and/or invoked by command line tools that are developed for various operating systems, including open-source or proprietary (closed) operating systems, and/or operating systems for smart phones or other mobile devices.

One embodiment of a method for providing a distributed lock manager in a distributed computing system that provides virtual computing systems to clients is illustrated by the flow diagram in FIG. 1. As illustrated at 110, in this example, the method may include a distributed system that provides virtual computing services (e.g., services implemented using virtualized computing resources) to clients implementing a distributed lock manager (DLM) that exposes an API to the clients. The method may also include a component of the DLM receiving a request to perform a lock management operation for a lock on a shared resource from a resource instance executing on the same node, where the resource instance implements a portion (e.g., a process or other component) of a distributed application, as in 120.

As illustrated in this example, the method may include the DLM component performing the requested operation, and communicating with another DLM component to share state information for the lock (e.g., a modified lock value or other state information resulting from performing the operation) over a control plane network that is physically or logically distinct from a data plane network (a portion of which is allocated to the application), as in 130. The method may also include the DLM (e.g., the DLM component that received the request and/or performed the requested operation) caching the state information locally (e.g., on the node on which this DLM component is executing), and the state information being written to persistent storage (e.g., by the DLM component that received the request and/or performed the requested operation or by another component of the DLM), as in 140.

Example Provider Network Environments

This section describes example provider network environments in which embodiments of the methods described herein may be implemented. However, these example provider network environments are not intended to be limiting.

Figure 2:
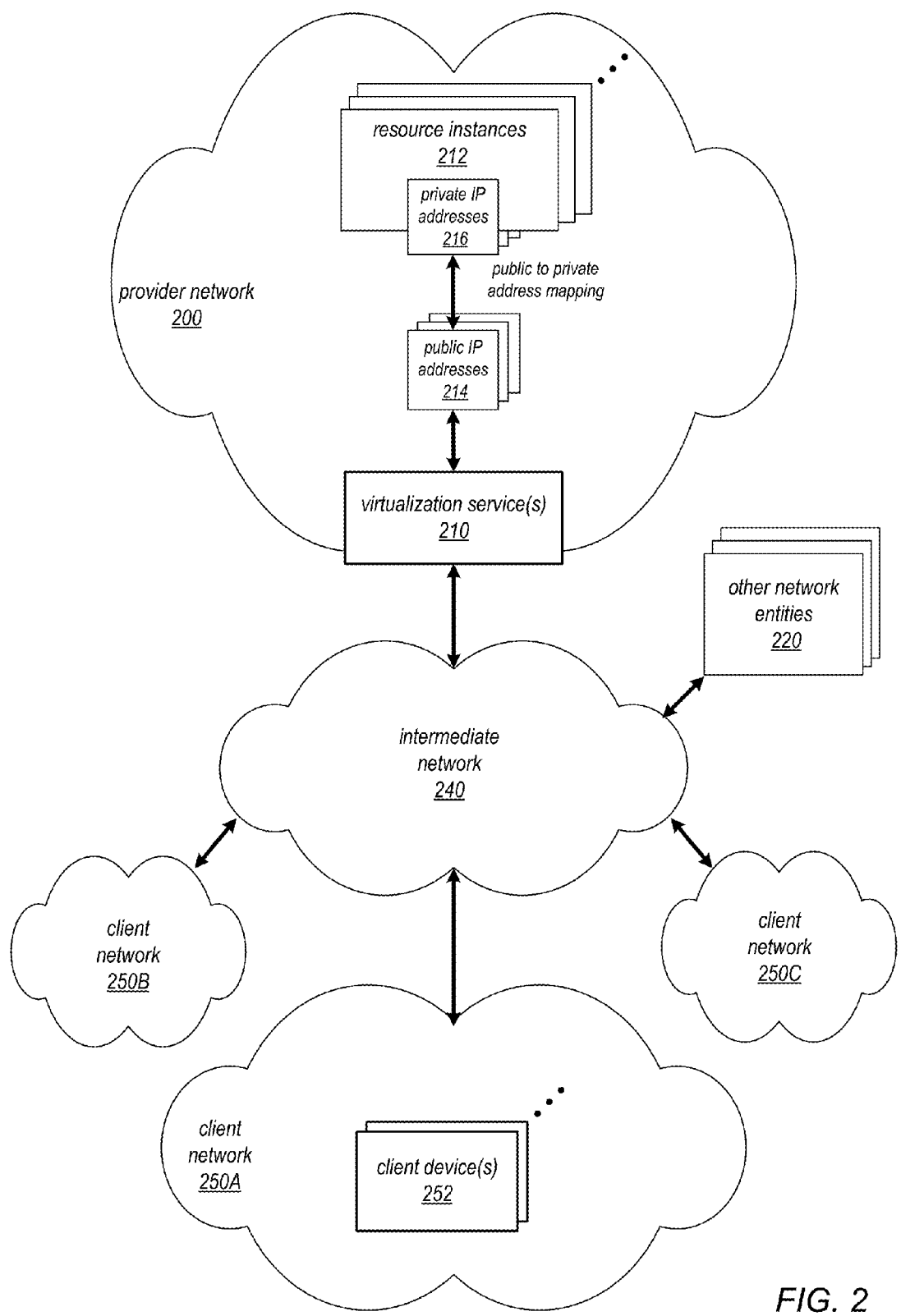
FIG. 2 is a block diagram illustrating an example provider network environment, according to at least some embodiments.

FIG. 2 illustrates an example provider network environment, according to at least some embodiments. A provider network 200 may provide resource virtualization to clients via one or more virtualization services 210 that allow clients to purchase, rent, or otherwise obtain instances 212 of virtualized resources, including but not limited to computation and storage resources, implemented on devices within the provider network or networks in one or more data centers. Private IP addresses 216 may be associated with the resource instances 212; the private IP addresses are the internal network addresses of the resource instances 212 on the provider network 200. In some embodiments, the provider network 200 may also provide public IP addresses 214 and/or public IP address ranges (e.g., Internet Protocol version 4 (IPv4) or Internet Protocol version 6 (IPv6) addresses) that clients may obtain from the provider 200.

Conventionally, the provider network 200, via the virtualization services 210, may allow a client of the service provider (e.g., a client that operates client network 250A) to dynamically associate at least some public IP addresses 214 assigned or allocated to the client with particular resource instances 212 assigned to the client. The provider network 200 may also allow the client to remap a public IP address 214, previously mapped to one virtualized computing resource instance 212 allocated to the client, to another virtualized computing resource instance 212 that is also allocated to the client. Using the virtualized computing resource instances 212 and public IP addresses 214 provided by the service provider, a client of the service provider such as the operator of client network 250A may, for example, implement client-specific applications and present the client's applications on an intermediate network 240, such as the Internet. Other network entities 220 on the intermediate network 240 may then generate traffic to a destination public IP address 214 published by the client network 250A; the traffic is routed to the service provider data center, and at the data center is routed, via a network substrate, to the private IP address 216 of the virtualized computing resource instance 212 currently mapped to the destination public IP address 214. Similarly, response traffic from the virtualized computing resource instance 212 may be routed via the network substrate back onto the intermediate network 240 to the source entity 220.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 200; a client may then assign their allocated public IP addresses to particular resource instances allocated to the client. These public IP addresses may be referred to as client public IP addresses, or simply client IP addresses. Instead of being assigned by the provider network 200 to resource instances as in the case of standard IP addresses, client IP addresses may be assigned to resource instances by the clients, for example via an API provided by the service provider. Unlike standard IP addresses, client IP addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

FIG. 3 illustrates an example data center (e.g., one that implements an overlay network on a network substrate using IP tunneling technology), according to at least some embodiments. As illustrated in this example, a provider data center 300 may include a network substrate that includes networking devices 312 such as routers, switches, network address translators (NATs), and so on. At least some embodiments may employ an Internet Protocol (IP) tunneling technology to provide an overlay network via which encapsulated packets may be passed through network substrate 310 using tunnels. The IP tunneling technology may provide a mapping and encapsulating system for creating an overlay network on a network (e.g., a local network in data center 300 of FIG. 3) and may provide a separate namespace for the overlay layer (the public IP addresses) and the network substrate 310 layer (the private IP addresses). Packets in the overlay layer may be checked against a mapping directory (e.g., provided by mapping service 330) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 330) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 3, an example overlay network tunnel 334A from a virtual machine (VM) 324A on host 320A to a device on the intermediate network 350 and an example overlay network tunnel 334B between a VM 324B on host 320B and a VM 324C on host 320C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 3, at least some networks in which embodiments of the distributed lock managers described herein may be implemented may include hardware virtualization technology that enables multiple operating systems to run concurrently on a host computer (e.g., hosts 320A and 320B of FIG. 3), i.e. as virtual machines (VMs) 324 on the hosts 320. The VMs 324 may, for example, be rented or leased to clients of a network provider. A hypervisor, or virtual machine monitor (VMM) 322, on a host 320 presents the VMs 324 on the host with a virtual platform and monitors the execution of the VMs 324. Each VM 324 may be provided with one or more private IP addresses; the VMM 322 on a host 320 may be aware of the private IP addresses of the VMs 324 on the host. A mapping service 330 may be aware of all network IP prefixes and the IP addresses of routers or other devices serving IP addresses on the local network. This includes the IP addresses of the VMMs 322 serving multiple VMs 324. The mapping service 330 may be centralized, for example on a server system, or alternatively may be distributed among two or more server systems or other devices on the network. A network may, for example, use the mapping service technology and IP tunneling technology to, for example, route data packets between VMs 324 on different hosts 320 within the data center 300 network; note that an interior gateway protocol (IGP) may be used to exchange routing information within such a local network.

In addition, a network such as the provider data center 300 network (which is sometimes referred to as an autonomous system (AS)) may use the mapping service technology, IP tunneling technology, and routing service technology to route packets from the VMs 324 to Internet destinations, and from Internet sources to the VMs 324. Note that an external gateway protocol (EGP) or border gateway protocol (BGP) is typically used for Internet routing between sources and destinations on the Internet. FIG. 3 shows an example provider data center 300 implementing a network that provides resource virtualization technology and that provides full Internet access via edge router(s) 314 that connect to Internet transit providers, according to at least some embodiments. The provider data center 300 may, for example, provide clients the ability to implement virtual computing systems (VMs 324) via a hardware virtualization service and the ability to implement virtualized data stores 316 on storage resources 318 via a storage virtualization service.

In some embodiments, the data center 300 network may implement IP tunneling technology, mapping service technology, and a routing service technology to route traffic to and from virtualized resources, for example to route packets from the VMs 324 on hosts 320 in data center 300 to Internet destinations, and from Internet sources to the VMs 324. Internet sources and destinations may, for example, include computing systems 370 connected to the intermediate network 340 and computing systems 352 connected to local networks 350 that connect to the intermediate network 340 (e.g., via edge router(s) 314 that connect the network 350 to Internet transit providers). The provider data center 300 network may also route packets between resources in data center 300, for example from a VM 324 on a host 320 in data center 300 to other VMs 324 on the same host or on other hosts 320 in data center 300.

A service provider that provides data center 300 may also provide additional data center(s) 360 that include hardware virtualization technology similar to data center 300 and that may also be connected to intermediate network 340. Packets may be forwarded from data center 300 to other data centers 360, for example from a VM 324 on a host 320 in data center 300 to another VM on another host in another, similar data center 360, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 318, as virtualized resources to clients of a network provider in a similar manner.

Note that a public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

In some embodiments, the DLMs described herein may be implemented in a distributed computing environment (e.g., a cloud computing environment that provides virtualized computing resources and/or services to clients) such as one of the example provider network environments illustrated in FIG. 2 or FIG. 3 and described above. In some embodiments, the components of a DLM implemented in such a system may communicate with each other over a control plane network (e.g., using network connectivity and/or throughput capacity other than that allocated to a client application executing in the cloud computing environment or used by components of a client application to communicate with each other and/or to access shared resources that are protected by locks).

In some embodiments, multiple resource instances may be executing in a cloud computing environment to implement a distributed application on behalf of a client. As previously noted, the cloud computing environment may be a multi-tenant environment in which each application (and/or each virtual private network) may have its own namespace. In some embodiments, each client may have its own allocation of network connectivity and/or throughput capacity (bandwidth). For example, the network connectivity and/or throughput capacity in the data plane network may be provisioned (e.g., designated or reserved) for the use of various clients. In some embodiments, one or more components (or instances) of a DLM may also be executing on each node on which one of the resource instances is executing, and these components may use network connectivity and/or throughput capacity other than that allocated to the client applications to communicate with each other. For example, in various embodiments, there may be one DLM component (or instance) per node, or one DLM component (or instance) per customer on each node.

In some embodiments, a component of a client application may make a local API call to the DLM component/ instance on the same node over a different connection mechanism than the network connection over which the components of the client application communicate with each other as part of their regular work (e.g., work other than lock management). By making local API calls to invoke various lock management operations (e.g., operations to create a lock, specify one or more properties of a lock, obtain a list of locks, subscribe to a lock, acquire a lock, release a lock or delete a lock), the components of the client application may participate in the locks managed by the DLM.

In some embodiments, while there are physical computers executing all of client applications and other processes described wherein, the client applications may be running as virtual machines on the physical computers. For example, internal processes of the cloud computing environment that are configured to manage the creation of these virtual machines, to provision resources for these virtual machines, and/or to perform other administrative tasks on behalf of clients and/or their applications (e.g., monitoring resource usage, customer accounting, billing for services, etc.) may execute in the control plane layer (or hypervisor) in the cloud computing environment. By contrast, client applications (e.g., each resource instance that implements an application component) may execute in a data plane layer of the cloud computing environment. Underneath these layers, there may be only one physical network card for each host node (or for multiple host nodes), in some embodiments, but each resource instance may execute as if it has its own network (e.g., a virtual network). In some embodiments, each resource instance may have its own data plane network connection(s), but may make local API calls (e.g., calls to a DLM component on the same node) without needing to rely on these data plane network connections.

In some embodiments, the DLM may also be implemented as a process running on the control plane (hypervisor) layer. As such, it may have network access that the client processes are not aware of and do not have access to. In such embodiments, the DLM may not consume any resources (e.g., compute instances or network connectivity/ bandwidth) of the data plane, and may not compete with client applications for those resources, but may only consume resources of the control plane. In various embodiments, the DLM components (or instances) may share lock state information for the locks it has created using any of a variety of underlying networks and networking mechanisms. In one embodiment, the DLM components may employ a high-speed interconnect designed for cluster communications (e.g., a communication link that complies with the InfiniBand® Architecture Specification) as the mechanism by which lock state information is shared. For example, when a change is made to the state of a lock, the DLM component that modified the lock (or another DLM component) may notify one or more other DLM components (e.g., DLM components executing on the same nodes as any client application components that are subscribers to the lock) that the lock state has changed and/or to communicate the modified lock state value to the subscribers. In various embodiments, the DLM component that modifies a lock (or another DLM component) may be responsible for updating a copy of the lock state information for the lock in a persistent data store (e.g., in the cloud computing environment).

Figure 4:
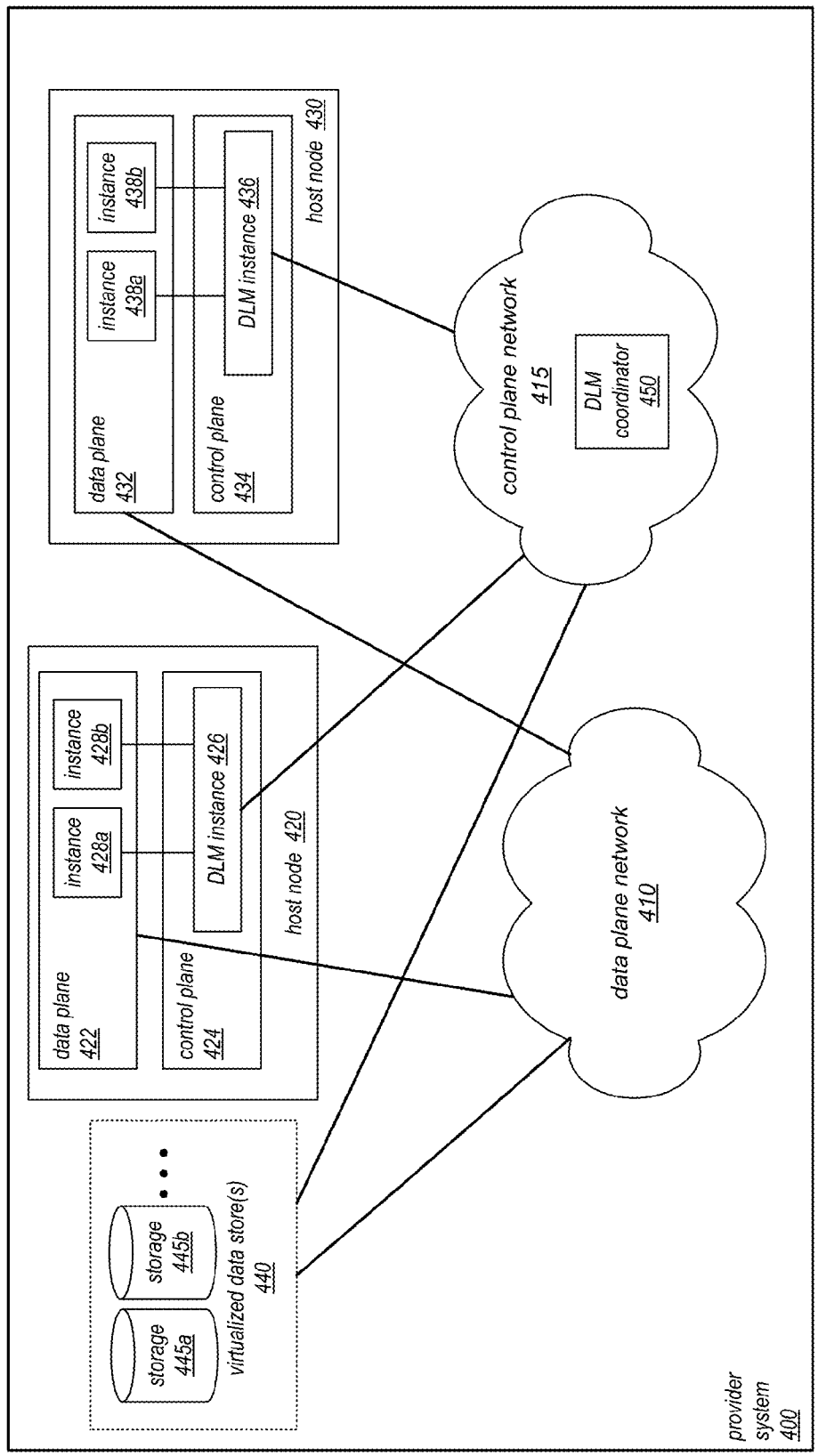
FIG. 4 is a block diagram illustrating an example data center that implements a distributed lock manager in the control plane, according to some embodiments.

FIG. 4 is a block diagram illustrating an example service provider system that implements a distributed lock manager in the control plane, according to some embodiments. In some embodiments, the provider system (shown as provider system 400 in FIG. 4) may be similar to provider data center 300 illustrated in FIG. 3. For example, the control plane on each host node in FIG. 4 may implement some or all of the functionality of the hypervisors or virtual machine monitors illustrated in FIG. 3. Similarly, the instances executing in the data plane on each host node in FIG. 4 may be virtual compute instances that implement some or all of the functionality of the virtual machines illustrated in FIG. 3.

More specifically, in the illustrated example, provider system 400 includes multiple virtualized data store(s) 440, host nodes 420 and 430 (each of which includes a data plane portion and a control plane portion), a data plane network 410, and a control plane network 415 (which may or may not be implemented on different physical hardware as data plane network 410, in different embodiments).

In this example, instances 428a-428b, and 438a-438b, which execute in respective portions of the control plane of the system (shown as 424 and 434), may implement one or more client applications or processes, at least some of which are configured to access a shared resource that is protected by a lock (e.g., a lock that is managed by a distributed lock manager, or DLM). In this example, to implement the applications/processes, these instances may be configured to communicate with each other and/or with other application components (e.g., storage devices 445 in virtualized data store(s) 440) over data plane network 410.

In the example illustrated in FIG. 4, instances 428a-428b, executing on host node 420, may be configured to make API calls to DLM instance 426 to initiate various lock management operations, and instances 438a-438b, executing on host node 430, may be configured to make API calls to DLM instance 436 to initiate various lock management operations. In this example, the DLM (which includes DLM instances 426 and 436, and which has access to virtualized data store(s) 440) executes in the control plane of the system (e.g., in respective portions of the control plane shown as 424 and 434) and its components may be configured to communicate with each other over control plane network 415 to manage one or more locks on shared resources on behalf of instances 428a-428b, and 438a-438b.

As illustrated in FIG. 4, in some embodiments, the service provider system may include a DLM coordinator component (e.g., DLM coordinator 450) in the control plane (e.g., on control plane network 415). For example, a DLM coordinator component (which may be sub-component of a cloud manager component in the control plane) may manage and/or coordinate at least some of the activities of the DLM instance as they work together to provide a distributed lock service. In various embodiments, the DLM instances may communicate with each other and/or with DLM coordinator 450 over control plane network 415. For example, DLM coordinator 415 may broker messages to and/or between DLM instances 426 and 436, e.g., to facilitate the distributed lock service maintaining a consistent (or eventually consistent) view of the state of the locks managed by the DLM (e.g., to keep all of the lock state information cached locally by each of the DLM instances up-to-date). In other embodiments, the DLM instances may (at least some of the time) communicate with each other directly over control plane network 415 to share lock state information and/or to ensure that the lock state information stored locally on each of the DLM instances remains up-to-date. In some embodiments, a DLM coordinator 450 may be configured to maintain a persistent data store for lock state information (not shown).

Figure 5:
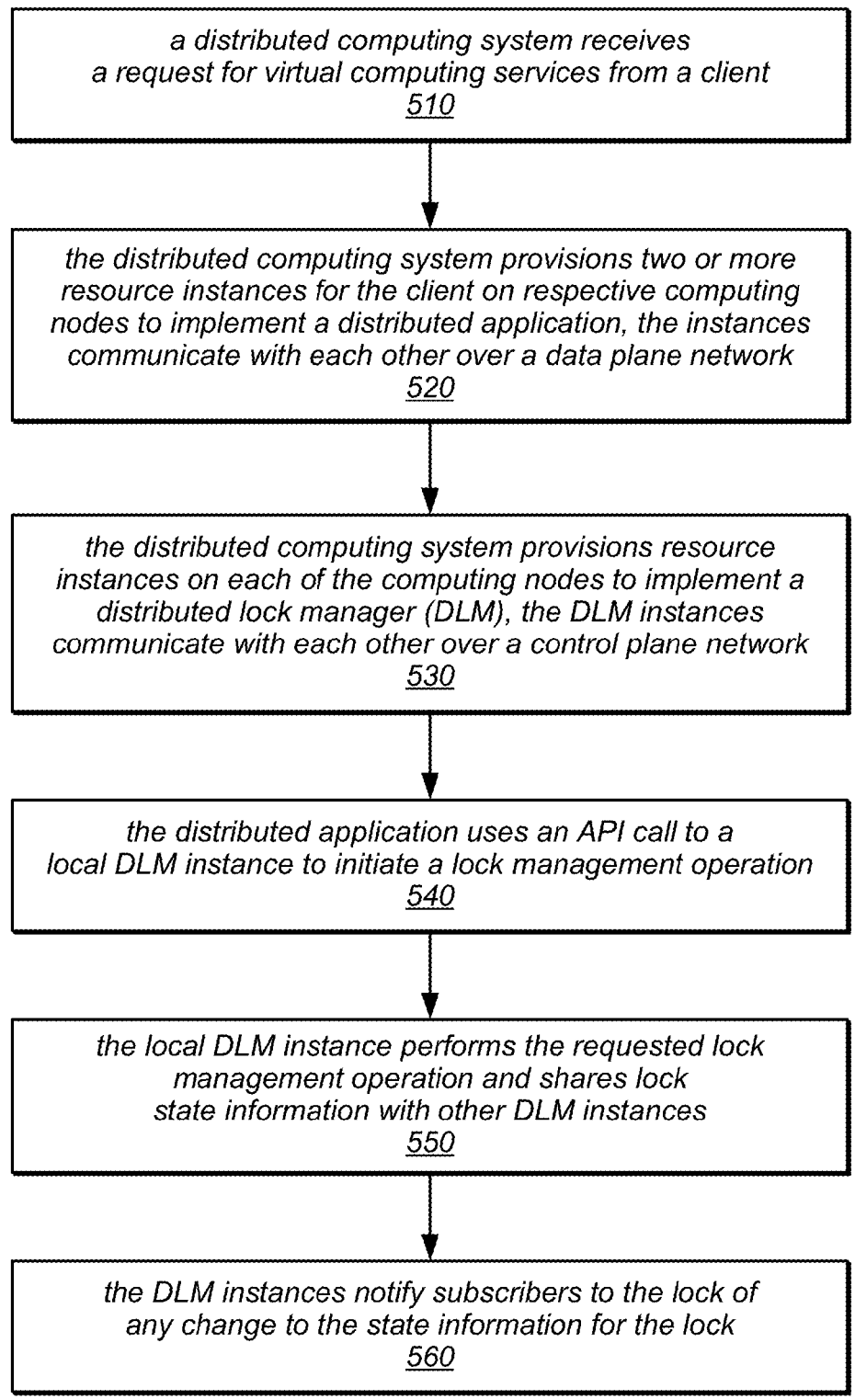
FIG. 5 is a flow diagram illustrating one embodiment of a method for implementing a distributed lock manager in a distributed computing system that provides virtualized resources.

One embodiment of a method for implementing a distributed lock manager in a distributed computing system that provides virtualized resources is illustrated by the flow diagram in FIG. 5. As illustrated at 510, in this example, the method may include a distributed computing system receiving a request for virtual computing services from a client. In response to the request, the method may include the distributed computing system provisioning two or more resource instances for the client on respective computing nodes to implement a distributed application, and configuring them in the system such that these resource instances communicate with each other over a data plane network, as in 520. For example, the system may provision various compute instances or execution platform instances, which may include provisioned computation resources, provisioned storage capacity, provisioned network connectivity and/or provisioned throughput capacity (e.g., bandwidth) on the data plane network, in some embodiments. Note that the data plane network may be the network over which components of the distributed application communicate with each other to do their work (e.g., work other than lock management).

As illustrated in this example, the method may include the distributed computing system provisioning resource instances on each of the computing nodes to implement a distributed lock manager (DLM), and configuring these DLM instances in the system such that they communicate with each other over a control plane network, as in 530. For example, the system may provision various compute instances or execution platform instances, which may include provisioned computation resources, provisioned storage capacity, provisioned network connectivity and/or provisioned throughput capacity (e.g., bandwidth) on the control plane network, in some embodiments. Note that the control plane network may be the network over which processes other than client processes execute and/or communicate with each other (e.g., processes for monitoring resource usage, client billing, authentication services, and/or other administrative tasks of the distributed computing system).

As illustrated at 540, the method may include the distributed application (e.g., an application component of the distributed application) using an API call to a local DLM instance (e.g., a DLM instance that is executing on the same computing node as the application component such that the call does not need to travel over a public or private network connection) to initiate performance of a lock management operation. For example, an application component may initiate the creation of a lock, the acquisition of a lock, the release of a lock, or another lock management operations according to an API that defines these and other operations. In some embodiments, the method may include the local DLM instance performing the requested lock management operation and sharing lock state information (e.g., a modified lock value or other state information resulting from performing the operation) with other DLM instances, as in 550. As described herein, the components of the DLM may communicate with each other over a control plane network of the distributed computing system, rather than over a data plane network of the system, in some embodiments. The method may also include the DLM instance(s) notifying subscribers to the lock of any change to the state information for the lock, as in 560. For example, each DLM instance may be responsible for notifying processes on the same node about any changes in the lock state information for a lock to which they are subscribed and/or for propagating lock state information changes to other DLM instances that are executing on nodes on which other subscribers to the lock are executing.

The application programming interface for the distributed lock managers described herein may define a variety of lock management operations for locks on shared resources, including, but not limited to:
  creating a lock (note that this may not include association the lock with a resource, which may the responsibility of the caller)
  setting values for certain properties for a lock (e.g., to specify sharing properties or a lock mode for the lock)
  obtaining a list of locks to which the client can subscribe
  viewing state information for a lock (e.g., such an API may allow multiple subscribers of the lock to view the state of the lock and because the state is changed atomically, the subscribers would get a consistent view of the lock state)
  requesting to become a member of a lock group for a given lock (i.e., to subscribed to a given lock), in response to which the DLM may return a handle for the lock or state information for the lock In some embodiments, a lock may be used to manage an elastic network interface (ENI) or another type of virtual network interface. For example, in some existing systems, if the network interface can be moved around, this makes it more difficult to try to use the network itself as the medium for managing the locks in the system, as in some existing systems. In other words, if the network interface were the only network interface for a particular application or resource instance and if it must be disconnected in order to move it, the application or resource instance may be sealed off from the lock manager. However, in the systems described herein, the distributed lock manager may not use the same physical or logical network to manage the lock for the network interface (e.g., to manage the association of the lock with the network interface or the ownership of the lock). Instead, the lock manager may use the control plane network of the cloud computing environment as its connectivity mechanism, and the control plane network may be hidden from the client application. In one example, an ENI may be moved to another host (along with its IP address and with its clients connected) in response to the failure of an instance. Since moving the ENI to another host brings its IP addresses along with it, a client only needs to know one IP address; the client does not need to know where that ENI is connected. In a traditional DLM solution, if that ENI was itself the data plane connectivity mechanism, it could not be move (because if it were moved, any connection to the data plane would be lost).

In another example, a clustered file system type application may create locks on disk volumes, and may keep standby databases up and running (e.g., mirroring those on the primary host). In this example, if the primary host fails, the corresponding disk volume(s) may be disconnected from the primary host and re-connected to one of the spares (e.g., a secondary host). In general, whenever there are shared resources in a distributed computing system, it may be useful to associate locks with those resources, since those locks can be used to indicate to the participants in the locks that one of the participants is holding the lock for a particular volume, and/or to communicate an identifier of that lock owner to the other participants.

Figure 6:
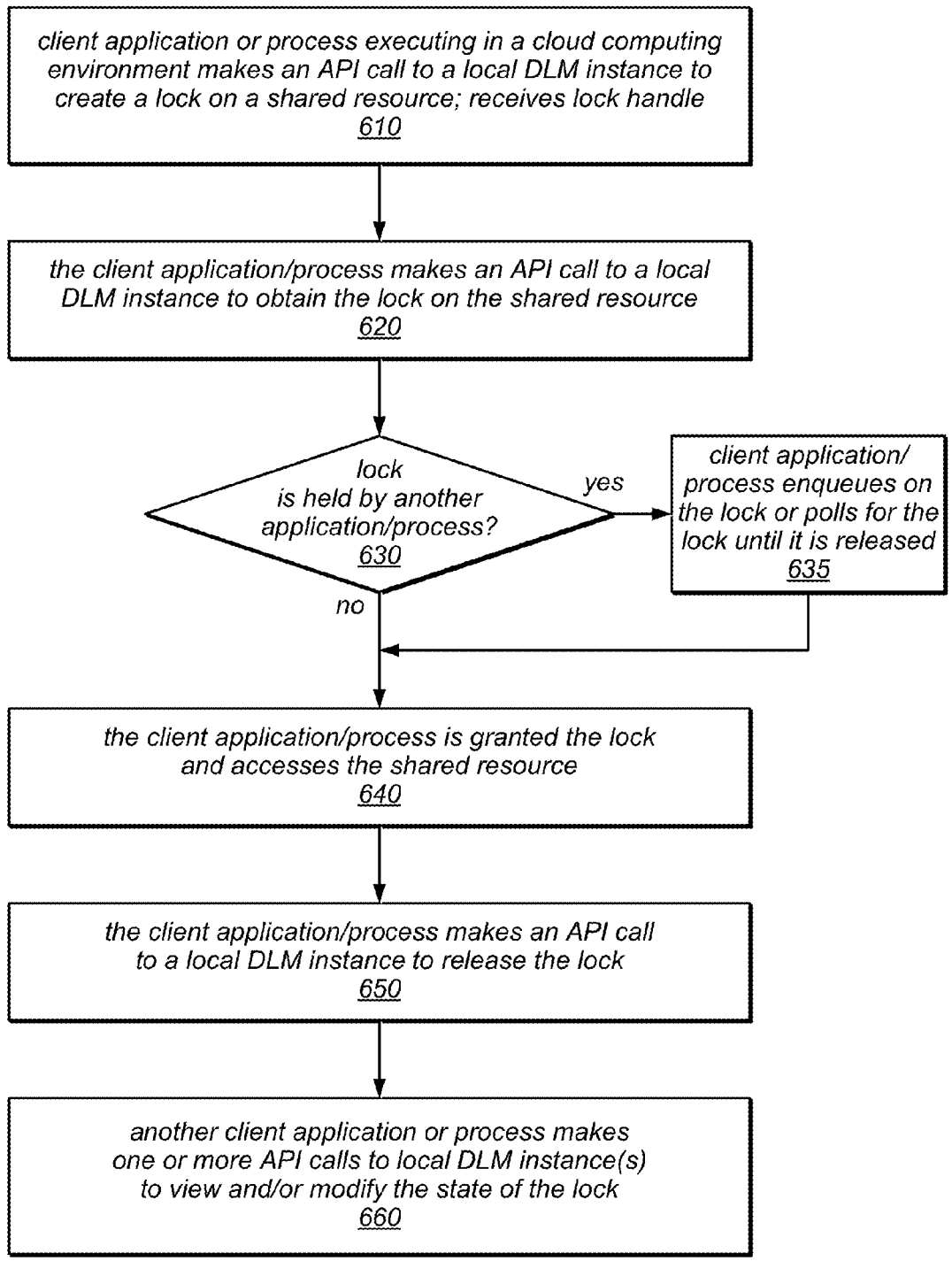
FIG. 6 is a flow diagram illustrating one embodiment of a method for a client application or process to access functionality of a distributed lock manager that is implemented in a cloud computing environment.

One embodiment of a method for a client application or process to access functionality of a distributed lock manager that is implemented in a cloud computing environment is illustrated by the flow diagram in FIG. 6. As illustrated at 610, in this example, the method may include a client application or process executing in a cloud computing environment making an API call to a local DLM instance (e.g., one executing on the same computing node) to create a lock on a shared resource, and in response to the lock being created, receiving an identifier of the newly created lock (e.g., a lock handle). In different embodiments, the application may be a distributed application or an application or process running on a single node that accesses a resource that is also accessible by another application or process. In some embodiments, creating the lock may also include making one or more additional API calls to set values for one or more properties of the lock (e.g., sharing properties).

As illustrated in this example, the method may include the client application/process making an API call to a local DLM instance to obtain (acquire) the lock on the shared resource, as in 620. For example, the request may include an identifier (or handle) for the lock and may be received from the same application/process that created the lock or a different application/process that also participates in the lock. Note that client application may not have visibility into the existence or location of any other DLM instances or have the ability to communication with any other DLM instances (which communicate with each other over a control plane network of the cloud computing network).

If the lock is held by another application or process, shown as the positive exit from 630, the method may include the client application/process enqueueing on the lock or polling for the lock until it is released (or is otherwise made available for acquisition), as in 635. If the lock is not held by another application/process (shown as the negative exit from 630 (or once it has been released by another application/process that holds the lock) the method may include the client application/process being granted the lock and accessing the shared resource, as in 640. In some embodiments, granting the lock may include atomically updating a copy of the lock state in a persistent data store and/or updating locally cached copies of the lock state in other DLM instances (all of which communicate with each other over a control plane network). In some embodiments, the client application/process accesses the shared resource over a data plane network in the cloud computing environment.

As illustrated in FIG. 6, at some point (e.g., when the application or process no longer requires access to the shared resource), the method may include the client application/process making an API call to a local DLM instance to release the lock, as in 650. Subsequently, the method may include another client application or process making one or more API calls to one or more local DLM instance(s) to view and/or modify the state of the lock, as in 660. For example, another client application or process may make an API call to query the lock (e.g., in order to determine whether the shared resource is locked and/or to determine the current owner), or to obtain/acquire (and later release) the lock.

In some embodiments, the distributed lock managers described herein may allow locks to be extended outside the control plane of the cloud computing environment. For example, in some embodiments, a customer may be able download and install a software process on their own premises (e.g., to download and install a client DLM agent) on a host computing node on a client network) to extend locks outside the cloud computing environment. In such embodiments, applications running on the host computing node on the client network may make API calls into the client DLM to perform various lock management operations. In some embodiments, the mechanism by which a client makes API calls is a secure channel, and clients can make API calls from an agent outside the cloud computing environment.

In one example, a customer may build an application inside a cloud computing environment, but may want the application controller (including a lock manager) to live on-premises (e.g., on a machine that is executing on a host node that is local to a client network). More specific example, the customer may request that ten resource instances be provisioned for their use in a cloud computing environment, and may associate locks with those ten instances, but the customer may also want to have a lock associated with a resource that lives outside of the cloud computing environment (e.g., a file on their local machine). The distributed lock managers described herein may allow the customer to create a lock for that file and set certain sharing properties for the lock (or the file), and may allow all subscribers to that lock to view consistent state information for the lock.

In another example, a customer may have an application running on a local machine, but may wish to provision some resources instances in a cloud computing environment to be used in case of a failure on the local machine. In this example, there may be locks associated with the application, and in the event of a failure, the locks may be moved to the resource instances in the cloud computing environment.

Note that in some embodiments in which a DLM spans between a cloud computing environment and a local client network, the client application and/or the DLM may be implemented within a VCP (virtual private cloud).

Figure 7:
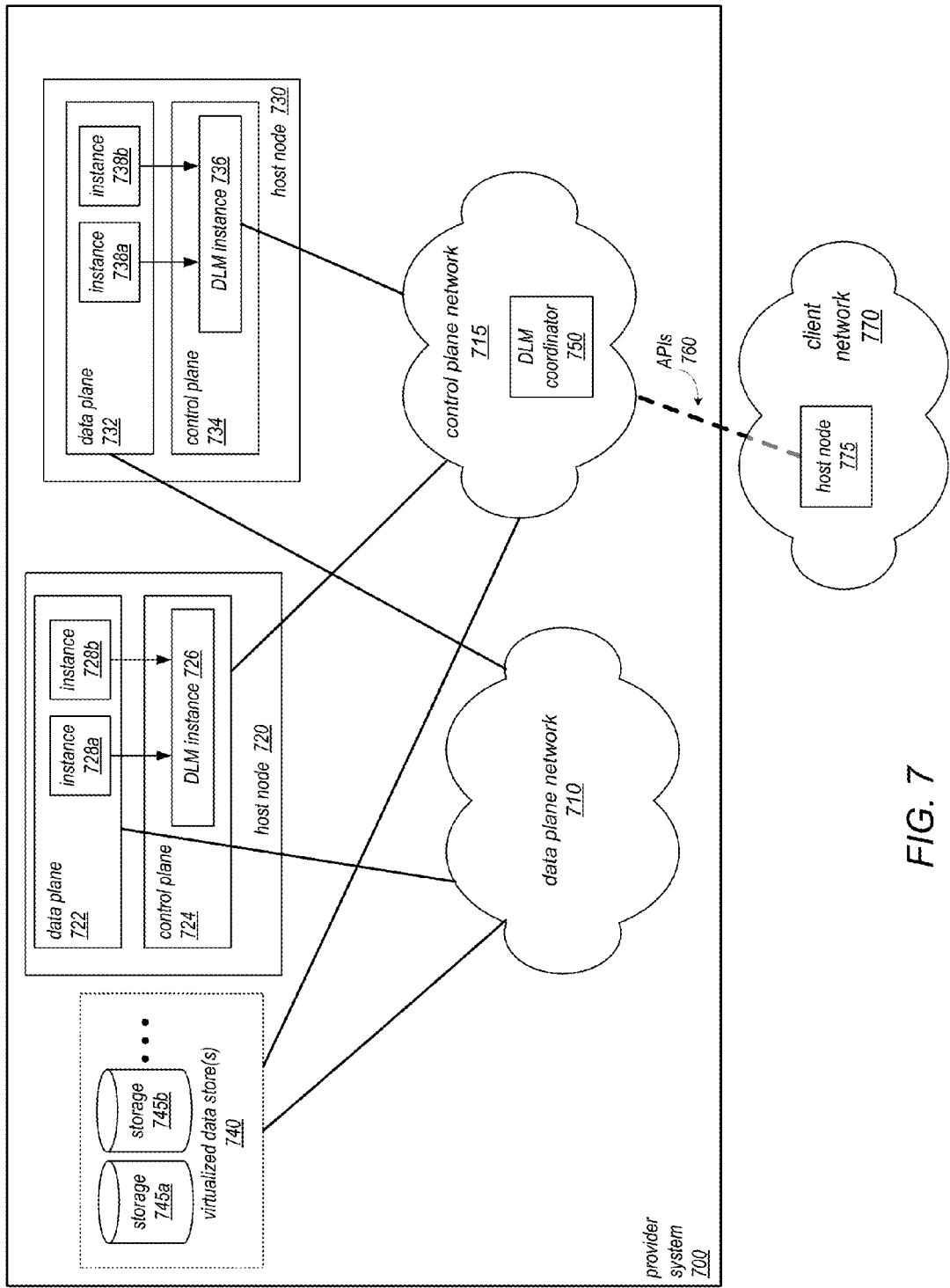
FIG. 7 is a block diagram illustrating an example data center that implements that implements a distributed lock manager in the control plane, and that exposes the distributed lock manager to processes executing outside of its environment, according to some embodiments.

FIG. 7 is a block diagram illustrating an example service provider system that implements that implements a distributed lock manager in the control plane, and that exposes the distributed lock manager to processes executing outside of its environment (e.g., outside of the service provider system), according to some embodiments. In various embodiments, provider system 700 may be similar to provider data center 300 illustrated in FIG. 3 and/or provider system 400 illustrated in FIG. 4. For example, the control plane on each host node in FIG. 7 may implement some or all of the functionality of the hypervisors or virtual machine monitors illustrated in FIG. 3. Similarly, the instances executing in the data plane on each host node in FIG. 7 may be virtual compute instances that implement some or all of the functionality of the virtual machines illustrated in FIG. 7.

More specifically, in the illustrated example, provider system 700 includes multiple virtualized data store(s) 740, host nodes 720 and 730 (each of which includes a data plane portion and a control plane portion), a data plane network 710, and a control plane network 715 (which may or may not be implemented on different physical hardware as data plane network 710, in different embodiments).

In this example, instances 728a-728b, and 738a-738b, which execute in respective portions of the control plane of the system (shown as 724 and 734), may implement one or more client applications or processes, at least some of which are configured to access a shared resource that is protected by a lock (e.g., a lock that is managed by a distributed lock manager, or DLM). In this example, to implement the applications/processes, these instances may be configured to communicate with each other and/or with other application components (e.g., storage devices 745 in virtualized data store(s) 740) over data plane network 710.

In the example illustrated in FIG. 7, instances 728a-728b, executing on host node 720, may be configured to make API calls to DLM instance 726 to initiate various lock management operations, and instances 738a-738b, executing on host node 730, may be configured to make API calls to DLM instance 736 to initiate various lock management operations. In this example, the DLM (which includes DLM instances 726 and 736, and which has access to virtualized data store(s) 740) executes in the control plane of the system (e.g., in respective portions of the control plane shown as 724 and 734) and its components may be configured to communicate with each other over control plane network 715 to manage one or more locks on shared resources on behalf of instances 728a-728b, and 738a-738b.

As illustrated in FIG. 7, in some embodiments, the service provider system may include a DLM coordinator component (e.g., DLM coordinator 750) in the control plane (e.g., on control plane network 715). For example, a DLM coordinator component (which may be sub-component of a cloud manager component in the control plane) may manage and/or coordinate at least some of the activities of the DLM instance as they work together to provide a distributed lock service. In various embodiments, the DLM instances may communicate with each other and/or with DLM coordinator 750 over control plane network 715. For example, DLM coordinator 715 may broker messages to and/or between DLM instances 726 and 736, e.g., to facilitate the distributed lock service maintaining a consistent (or eventually consistent) view of the state of the locks managed by the DLM (e.g., to keep all of the lock state information cached locally by each of the DLM instances up-to-date). In other embodiments, the DLM instances may (at least some of the time) communicate with each other directly over control plane network 715 to share lock state information and/or to ensure that the lock state information stored locally on each of the DLM instances remains up-to-date. In some embodiments, a DLM coordinator 750 may be configured to maintain a persistent data store for lock state information (not shown).

Unlike in the example illustrated in FIG. 4, an interface to the DLM of provider system 700 illustrated in FIG. 7 may be exposed to processes executing outside of provider system 700. In this example, various applications and/or processes executing on a host node 775 on client network 770 may be able to participate in the locking mechanisms of the DLM (e.g., to initiate lock management operations on locks for resources shared by those applications/processes and applications/processes executing on host node 720 or host node 730) through various APIs 760. As described herein, in some embodiments, a DLM client agent may be instantiated on host node 775 to allow an application or process executing on host 775 to access the locks managed by the DLM using local API calls to the DLM client agent. In such embodiments, applications/processes executing outside of the provider system may subscribe to and/or participate in the management of these locks without having to know anything about the network addresses, network connectivity, and/or network resources of the DLM components implemented within provider system 700, as the local DLM client agent would handle communications with those components in response to various local API calls.

In the example illustrated in FIG. 7, API calls (e.g., API calls conforming to APIs 760) made by applications/processes executing on host node 775 on client network 770 to the distributed lock manager (or a distributed lock service provided by the components of the distributed lock manager) may be brokered by DLM coordinator 750, which may determine the particular host nodes (or, more specifically, the DLM instances on particular host nodes) to which the API calls should be routed. In other embodiments, API calls made by applications/processes executing on host node 775 on client network 770 may be directed to specific DLM instances on particular host nodes without being routed through DLM coordinator 750. For example, in some embodiments, a communication channel (e.g., an overlay network tunnel over control plane network 715, or another type of communication channel over control plane network 715) may be established between an application/process executing on host node 775 and a specific DLM instance as a result of the application/process subscribing to a particular lock (e.g., through communications brokered by DLM coordinator 750 or another control plane component). Once the subscription has been granted and/or the communication channel has been established, subsequent communications between the application/process executing on host node 775 and the specific DLM instance (e.g., various API calls that conform to APIs 760) may take place over this communication channel (e.g., directly), rather than through DLM coordinator 750.

Figure 8:
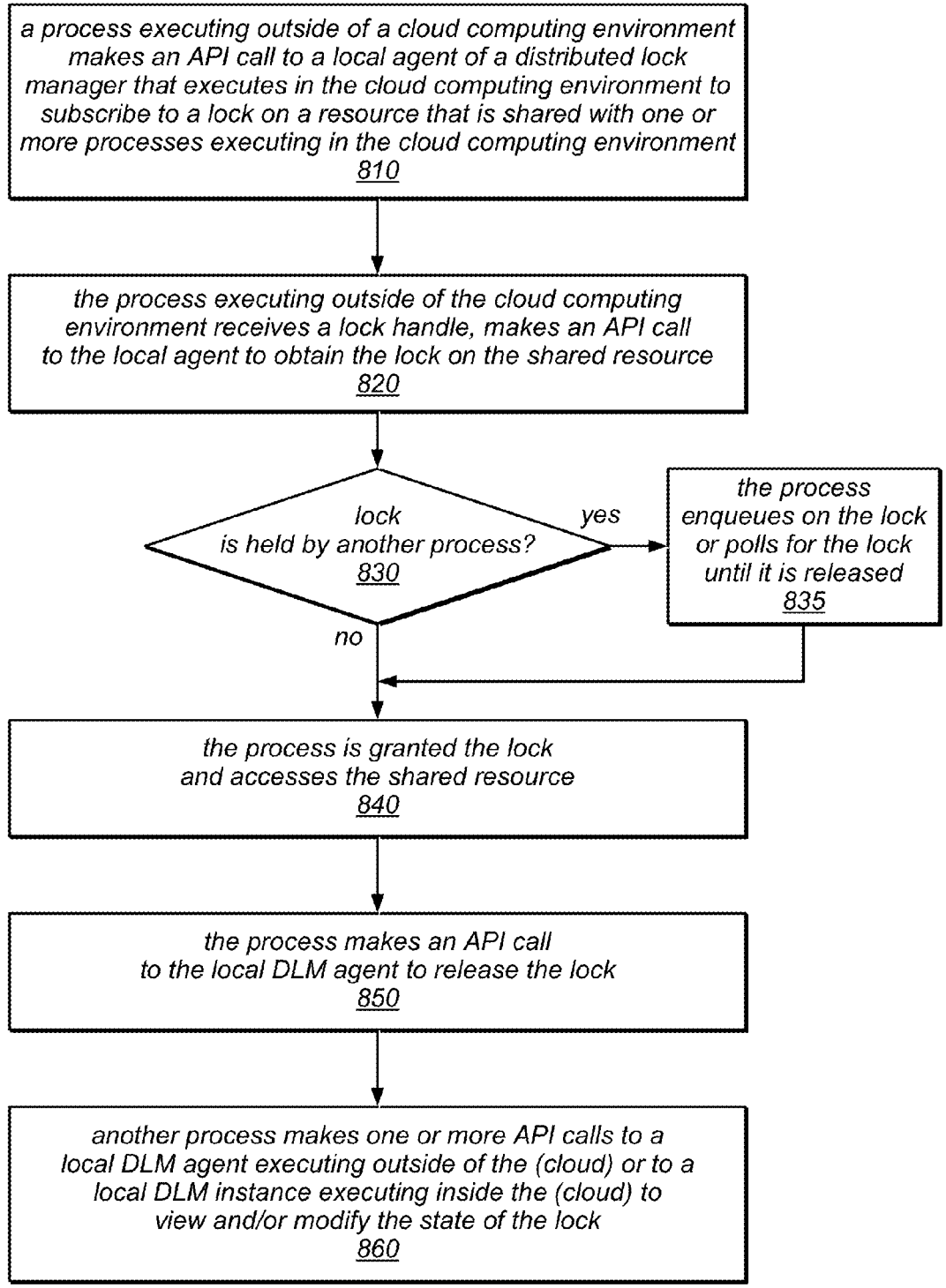
FIG. 8 is a flow diagram illustrating one embodiment of a method for a client application or process that executes outside of a cloud computing environment to access functionality of a distributed lock manager that is implemented in a cloud computing environment.

One embodiment of a method for a client application or process that executes outside of a cloud computing environment to access functionality of a distributed lock manager that is implemented in a cloud computing environment is illustrated by the flow diagram in FIG. 8. As illustrated at 810, in this example, the method may include a client process executing outside of a cloud computing environment making an API call to a local agent of a distributed lock manager that executes in the cloud computing environment to subscribe to a lock on a resource that is shared with one or more processes executing in the cloud computing environment. For example, the client process may make an API call to a client DLM agent that is executing on the same computing node as the calling process. In response to that call, the method may include the client process that is executing outside of the cloud computing environment receiving an identifier of the lock (e.g., a lock handle) or a value of the lock, after which it may make an API call to the local agent of the distributed lock manager to obtain (acquire) the lock on the shared resource, as in 820. In some embodiments, this may, in turn, initiate a communication between the local client DLM agent and a component of the DLM that is executing in the cloud computing environment (e.g., to share lock state information for the lock with other subscribers).

As illustrated in this example, if the lock is held by another process, shown as the positive exit from 830, the method may include the client process enqueueing on the lock or polling for the lock until it is released (or is otherwise made available for acquisition), as in 835. Note that the lock may be held by another process executing outside the cloud computing environment or by a process executing inside the cloud computing environment. If the lock is not held by another process (shown as the negative exit from 830 (or once it has been released by another process that holds the lock) the method may include the client process being granted the lock and accessing the shared resource, as in 840. In some embodiments, granting the lock may include atomically updating a copy of the lock state in a persistent data store and/or updating locally cached copies of the lock state in the local client DLM agent and/or in other DLM components in the cloud computing environment (some or all of which may communicate with each other over a control plane network). In some embodiments, granting the lock may include the DLM returning a lock state value indicating that the process has been granted the lock.

As illustrated in FIG. 8, at some point (e.g., when the process no longer requires access to the shared resource), the method may include the client process making an API call to the local client DLM agent to release the lock, as in 850. In some embodiments, this may, in turn, initiate a communication between the local client DLM agent and one or more components of the DLM executing in the cloud (e.g., to share state information for the lock with other subscribers). Subsequently, the method may include another process making one or more API calls to a local client DLM agent executing outside of the cloud computing environment or to a local DLM instance executing inside the cloud computing environment to view and/or modify the state of the lock, as in 860. In other words, the other process may make an API call to the DLM agent or instance that is local to that process (e.g., the DLM agent or instance that is executing on the same host node in the cloud computing environment or outside the cloud computing environment as that process). For example, another client application or process may make an API call to query the lock (e.g., in order to determine whether the shared resource is locked and/or to determine the current owner), or to obtain/acquire (and later release) the lock.

Illustrative System

In at least some embodiments, a server that implements some or all of the techniques for implementing a distributed lock manager as described herein may include a general-purpose computer system that includes or is configured to access a non-transitory computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for implementing a distributed lock manager, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in the figures, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 12 for implementing various embodiments of the distributed lock managers described herein. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:

1. A system, comprising:
   a plurality of computing nodes that are coupled to each other over a network and that collectively provide virtual computing services to one or more clients, each of the computing nodes comprising at least one processor and a memory;
   two or more virtual compute instances, each executing on a respective one of two or more of the computing nodes, wherein each of the virtual compute instances is configured to implement an application component of a distributed application on behalf of a client, and wherein the virtual compute instances are configured to communicate with each other over at least a portion of the network; and
   a distributed lock manager comprising two or more components, each executing on a respective one of the two or more computing nodes, wherein the distributed lock manager components are configured to share state for one or more locks on respective shared resources, and wherein to share state for the one or more locks, the distributed lock manager components are configured to communicate with each other over a network that is physically or logically distinct from the at least a portion of the network over which the virtual compute instances communicate with each other;
   wherein one of the application components is configured to invoke a call to the distributed lock manager component that is executing on the computing node on which the virtual compute instance that implements the application component is executing to initiate performance of a lock management operation for a lock on a shared resource that is accessed by the distributed application.

2. The system of claim 1, wherein the network over which the distributed lock manager components communicate with each other comprises a control plane network of a service provider computing environment, and wherein the at least a portion of the network over which the virtual compute instances communicate with each other comprises a data plane network of the service provider computing environment.

3. The system of claim 1, wherein, in response to the call to the distributed lock manager component, the distributed lock manager component is configured to:
   perform the lock management operation; and
   communicate a resulting state of the lock to at least one distributed lock manager component executing on a computing node other than the one on which the distributed lock manager component is executing.

4. The system of claim 1, wherein the two or more computing nodes implement a virtual private network for the client.

5. A method, comprising:
   performing by one or more computers:
      receiving, by a component of a distributed lock manager executing on a given one of a plurality of computing nodes, a request to perform a lock management operation for a lock on a shared resource, wherein said receiving comprises receiving the request from a compute instance executing on the given computing node, and wherein the compute instance accesses the shared resource using network resource capacity allocated for the compute instance; and
      performing the requested lock management operation, wherein said performing comprises the distributed lock manager component communicating with another distributed lock manager component executing on another one of the plurality of computing nodes to share state information for the lock using network resource capacity other than the network resource capacity allocated for the compute instance.

6. The method of claim 5,
   wherein the compute instance implements an application component of a distributed application; and
   wherein the method further comprises the application component communicating with at least one other component of the distributed application using the network resource capacity allocated for the compute instance.

7. The method of claim 5, wherein the plurality of computing nodes implement a distributed lock service.

8. The method of claim 5, wherein the plurality of computing nodes implement one or more virtual computing services.

9. The method of claim 5, wherein said performing the lock management operation comprises associating the lock with the shared resource, and wherein said communicating comprises communicating the association to the other distributed lock manager component.

10. The method of claim 5, wherein said performing the lock management operation comprises modifying a value of the lock.

11. The method of claim 10, wherein the value of the lock identifies an owner of the shared resource.

12. The method of claim 10, further comprising:
   a component of the distributed lock manager writing the modified value of the lock to a persistent data store.

13. The method of claim 10, wherein said modifying the lock value comprises atomically modifying the lock value.

14. The method of claim 5, wherein the network resource capacity allocated for the compute instance comprises network connectivity resources or input/output throughput capacity.

15. The method of claim 5, wherein said performing further comprises caching state information for the lock on the given computing node.

16. A non-transitory computer-readable storage medium storing program instructions that when executed on one or more computers cause the one or more computers to perform:
   receiving, by a component of a distributed lock manager executing on a given one of a plurality of computing nodes, a request to perform a lock management operation for a lock that is associated with an entity to which shared access is to be controlled, wherein said receiving comprises receiving the request from a resource instance executing on the given computing node, wherein the plurality of computing nodes implement a distributed lock service, wherein the resource instance accesses the entity that is associated with the lock, and wherein the request conforms to an application programming interface that defines one or more lock management operations supported by the distributed lock manager; and
   performing the requested lock management operation, wherein said performing comprises the distributed lock manager component communicating with another component of the distributed lock manager executing on another one of the plurality of computing nodes to share state information for the lock using network connectivity other than a network connectivity with which the resource instance accesses the entity that is associated with the lock.

17. The non-transitory computer-readable storage medium of claim 16, wherein the request comprises a request to create a lock, wherein said performing the requested lock management operation comprises creating a lock and returning an identifier of the lock to the resource instance from which the request was received, and wherein said communicating comprises communicating the identifier of the lock to the other component of the distributed lock manager.

18. The non-transitory computer-readable storage medium of claim 16, wherein the request comprises a request to subscribe to the lock or a request to set a value of a property of the lock.

19. The non-transitory computer-readable storage medium of claim 16, wherein the request comprises a request to acquire the lock or a request to release the lock, wherein said performing the requested operation comprises modifying a lock value for the lock, and where said communicating comprises communicating the modified lock value to the other component of the distributed lock manager.

20. The non-transitory computer-readable storage medium of claim 16,
   wherein the plurality of computing nodes are coupled to each other over a network and collectively provide virtual computing services to one or more clients;
   wherein when executed on the one or more computers, the program instructions further cause the one or more computers to perform:
      receiving a second request to perform a lock management operation for the lock, wherein the second request is received from a computing node other than one of the plurality of computing nodes that are coupled to each other over the network and that collectively provide virtual computing services to one or more clients, and wherein the request conforms to the application programming interface that defines the one or more lock management operations supported by the distributed lock manager.

21. The non-transitory computer-readable storage medium of claim 16, wherein the entity that is associated with the lock comprises a virtual network interface.

* * * * *